(12) United States Patent
Gschrey et al.

(10) Patent No.: US 10,795,339 B2
(45) Date of Patent: Oct. 6, 2020

(54) APPARATUS AND METHOD FOR PROCESSING CONTAINERS HAVING QUERYING PROCESSING DEVICES

(71) Applicant: KRONES AG, Neutraubling (DE)

(72) Inventors: Andreas Gschrey, Tegernheim (DE); Thomas Hensel, Aying (DE); Falk Huppelsberg, Düsseldorf (DE)

(73) Assignee: KRONES AG, Neutraubling (DE)

( * ) Notice: Subject to any disclaimer, the term of this patent is extended or adjusted under 35 U.S.C. 154(b) by 121 days.

(21) Appl. No.: 15/757,670

(22) PCT Filed: Sep. 7, 2016

(86) PCT No.: PCT/EP2016/071117
§ 371 (c)(1),
(2) Date: Mar. 6, 2018

(87) PCT Pub. No.: WO2017/042234
PCT Pub. Date: Mar. 16, 2017

(65) Prior Publication Data
US 2019/0025796 A1    Jan. 24, 2019

(30) Foreign Application Priority Data

Sep. 7, 2015 (DE) ........................ 10 2015 114 947

(51) Int. Cl.
*G05B 19/408* (2006.01)
*B67C 3/22* (2006.01)
(Continued)

(52) U.S. Cl.
CPC .......... *G05B 19/4083* (2013.01); *B29C 49/78* (2013.01); *B65C 9/40* (2013.01);
(Continued)

(58) Field of Classification Search
None
See application file for complete search history.

(56) References Cited

U.S. PATENT DOCUMENTS

2003/0022396 A1    1/2003 Ogawa
2005/0235230 A1    10/2005 Bohn et al.
(Continued)

FOREIGN PATENT DOCUMENTS

CN    1336280 A    2/2002
CN    102026794 A    4/2011
(Continued)

OTHER PUBLICATIONS

International Search Report PCT/EP2016/071117, International Filing dated Sep. 7, 2016.
(Continued)

*Primary Examiner* — Kenneth M Lo
*Assistant Examiner* — Istiaque Ahmed
(74) *Attorney, Agent, or Firm* — Schmeiser, Olsen & Watts, LLP

(57) ABSTRACT

Provided is a method for processing containers, wherein the containers are processed by. a first processing device in a first predetermined manner and are transported by. a transport device to a second processing device and are processed by this second processing device in a second predetermined manner, and wherein the processing devices are in each case controlled by at least control devices, wherein for the control parameters are used which are characteristic of the containers and/or the processing of the containers. According to the embodiment, predetermination parameters are output on at least one and preferably on several control devices, and said output predetermination parameters are compared with parameters required by at least one processing device, and it is checked whether the parameters required by the at least
(Continued)

one processing device can be derived at least from the predetermination parameters.

9 Claims, 2 Drawing Sheets

(51) Int. Cl.
    *B29C 49/78*     (2006.01)
    *B67C 3/00*     (2006.01)
    *B65C 9/40*     (2006.01)
    *G06F 16/245*     (2019.01)

(52) U.S. Cl.
    CPC ........ *B67C 3/007* (2013.01); *B67C 2003/227* (2013.01); *G05B 2219/31103* (2013.01); *G05B 2219/31206* (2013.01); *G05B 2219/45244* (2013.01); *G06F 16/245* (2019.01)

(56) References Cited

U.S. PATENT DOCUMENTS

| | | | | |
|---|---|---|---|---|
| 2008/0215176 A1* | 9/2008 | Borovinskih | ......... | G06Q 50/04 700/117 |
| 2011/0260372 A1* | 10/2011 | Hahn | ...................... | B29C 49/42 264/500 |
| 2013/0231772 A1* | 9/2013 | Hahn | ...................... | B29C 49/78 700/204 |
| 2014/0237944 A1 | 8/2014 | Hahn | | |

FOREIGN PATENT DOCUMENTS

| | | |
|---|---|---|
| CN | 103052567 A | 4/2013 |
| CN | 104760262 A | 7/2015 |
| DE | 10317065 A1 | 7/2004 |
| DE | 10338692 A1 | 4/2005 |
| DE | 102006006176 A1 | 8/2007 |
| DE | 102010033171 A1 | 2/2012 |
| DE | 102013218020 A1 | 3/2015 |

OTHER PUBLICATIONS

Chinese Office Action dated Apr. 28, 2020 for Application No. 2016800516826.

* cited by examiner ed on to the individual control devices of the processing devices. As explained in greater detail below, the parameters are preferably container parameters or working parameters.

APPARATUS AND METHOD FOR PROCESSING CONTAINERS HAVING QUERYING PROCESSING DEVICES

CROSS-REFERENCE TO RELATED APPLICATIONS

This application claims priority to PCT Application No. PCT/EP2016/071117, having a filing date of Sep. 7, 2016, based on German Application No. 10 2015 114 947.8, having a filing date of Sep. 7, 2015, the entire contents both of which are hereby incorporated by reference.

FIELD OF TECHNOLOGY

The following relates to an apparatus and a method for processing containers. Numerous apparatuses of this type are known from the known art, such as for example filling machines, labelling machines, blow molding machines and the like. Furthermore, systems are also known from the known art which have a plurality of different machines, for example a block consisting of a blow molding machine, a filler arranged downstream and a labelling machine. The following relates in particular to such systems.

BACKGROUND

During the operation of such systems it often happens that product types have to be changed. In this case the new parameters are set individually on each individual machine during a product change. In addition, in the applicant's internal known art a machine is also known, in which this parameter setting of each machine takes place by a central point (for example a touch screen of a specific machine) for all machine. However, here too, a complete parameter set with all values must be input in full for every individual machine. This is a relatively time-consuming procedure and, furthermore, it also necessitates a very high level of concentration by the user.

SUMMARY

An aspect relates to a machine which simplifies such parameterisation. In addition, the time required for such a parameterisation should also be reduced.

In the method according to embodiments of the invention for processing containers, the containers are processed by a first processing device in a first predetermined manner and are transported by a transport device to a second processing device and are processed by this second processing device in a second predetermined manner. In this case these processing devices are in each case controlled by at least one control device, wherein for the control parameters are used which are characteristic of the containers and/or the processing of the containers.

According to embodiments of the invention, predetermination parameters are output on at least one and preferably on a plurality of the control devices, and said output predetermination parameters are compared with parameters required by at least one processing device, and it is checked whether the parameters required by the at least one processing device can be derived at least from the predetermination parameters and are preferably contained therein.

Therefore a method is proposed which makes it possible that the complete parameter sets no longer have of necessity to be input for all machines. Thus specific parameters are input via a main control device. These parameters are also passed on to the individual control devices of the processing devices. As explained in greater detail below, the parameters are preferably container parameters or working parameters.

The control device which outputs the predetermination parameters is designated below as the main control device or the master control device. The control device(s) which accept the predetermination parameters or to which the predetermination parameters are output are designated in the following as sequence control devices. These control devices preferably serve for controlling the individual processing devices. The main control device can also serve for controlling a specific processing device, such as for instance a filling machine, but it would also be conceivable that the main control device is a higher-level system control device and is not specifically assigned to a particular processing device.

The sequence control device or also the main control device(s) check whether these predetermination parameters are complete for the respective processing device, i.e. whether on the basis of the predetermination parameters a complete parameterisation of the respective processing device can take place. Therefore at least the control device, into which the parameters are input, and the sequence control devices of the individual processing devices are preferably in communication. It is therefore proposed that the individual processing devices or the control devices thereof are configured as "ready to learn" and/or "self-parameterising" controls.

These control devices can communicate with one another and so, if applicable, can agree about new parameter inputs. Within the context of the communication mentioned here between the processing devices and in particular the control devices thereof, parameters are in particular transmitted and in particular relevant parameters are transmitted for the operation of the individual processing devices. In this case it is possible that the main control device communicates in each case with all further (sequence) control devices and/or outputs data thereto, but it would also be possible (alternatively or additionally) that the sequence control devices also communicate with one another.

If for example an operator inputs the following as parameter on a filling device:

Change of type in 20 minutes, new speed: 35,000 bottles/hour, new bottle size: 1.5 litres, new bottle diameter 70 mm, it is possible that these parameters are transmitted to all further processing devices provided (and in particular the control devices thereof) in the entire system. Each individual processing device preferably collects information by itself and checks whether additional information is necessary and, if so, what information is necessary.

Only then does the corresponding sequence control device transmit to the initiating machine (in particular to the main control device) a specific enquiry about information not provided. For example, a filling device has sent the above information to the blow molding machine. The blow molding machine responds that the data have been received and additionally requests that the operator should also for example specify a preform temperature and a container height. The main control device passes on this question to the user and the user enters the corresponding input. Again the response, i.e. the newly input data, is preferably distributed to all further machines. In this way it is possible that all data are already made available to individual machines, without having to request the data by itself and in particular without the user having to input these data for the specific machine.

In a further method it would also be possible for the system to have several processing devices and for each individual one to make a corresponding enquiry to the main control device. On the basis of the enquiry this device can determine what data are still to be input. If for example the container height of two machines is requested, it is sufficient to specify this parameter only once.

In a further advantageous variant the predetermination parameters are input by a user. This can be done for example via an input means such as a keyboard or a touchscreen.

In a further advantageous method the main control device or master control device communicates with the sequence control devices. It would also be possible for the sequence control devices to communicate with one another. The master control is understood below in particular to be the control device by which the parameters are predetermined. This may be for example the control device of one of the processing devices, for instance the control device of a filling device or a blow molding machine.

In a further preferred method a machine start is prevented if not all of the parameters required by the individual processing devices have been input. In order to achieve this, each individual sequence control device can for example compare the data already available to it with the required data.

In a further preferred method at least one parameter is determined by measurement. Thus it would be possible, for example, for the user to transfer a (sample) container to a measuring device and to determine the parameter specified by this (sample) container. However it would also be possible that markings, such as for example colour codes, QR codes or RFID tags are read for input of the parameters.

In a further preferred method, required parameters which cannot be derived from the predetermination parameters are requested. In particular such required parameters are requested by a sequence control device. Thus for example the sequence control device can determine that all parameters necessary for their operation are not yet available, and this device can request these missing parameters again from the main control device.

In this case it is possible for the parameters still required to be output to the user by. a display device such as for instance a display. In this case it would also be possible that the parameters already input are simultaneously output to the user, so that the user can carry out a quick comparison and in particular can establish which parameters are still to be input.

In a further method it would also be possible for the sequence control device to enquire whether old parameters or preceding parameters can be used. Thus it is conceivable that in the event of a change of type not all parameters are modified, for example if there is to be a change from a container of a specific height to a different container but with the same height. In this case it would also be possible for the user or the main control device to predetermine the information so that known parameters can be employed. It would also be possible for the sequence control device to present proposals for parameters to be selected, for instance if it is possible to determine from the predetermination parameters that one of three possible containers should be produced. In this case the missing parameters for the possible future container can be used and/or a selection for possible parameter can be predetermined for the user.

In a further method it is also possible for the sequence control device itself to determine missing parameters. Thus it would be possible for example that a specific system is always operated with, for example, three different types of container. If a change of type is now initiated and several parameters have already been input by the user, the sequence control can already determine, from the parameter set which has still not been input in full, the type to which it should be changed. In this case the sequence control device can supplement the still missing parameters, since they are known from earlier processing. In such a case the sequence control device can preferably also output proposals for the missing parameters which the user only still has to confirm. Therefore the sequence control device and/or the main control device preferably determines the missing parameters itself from the predetermination parameters, in particular on the basis of data or parameters earlier used and/or already stored.

In a further advantageous method a type to be changed is identified by the predetermination parameters. This identification can also take place in particular if the predetermination parameters are not complete, i.e. not all of the parameters required by the respective control device are included.

The predetermination parameters are preferably stored in a storage device of the sequence control device. Preferably the parameters which are required for the operation of the processing device controlled by the sequence control device are also stored in the sequence control device, for example in the storage device of the sequence control device.

The method proposed here is preferably used in the event of a change of type, i.e. in particular if a change is to be made in an operation from one specific type of container and/or beverage to another type of container and/or beverage.

In a further preferred method, requested parameters are output at several and preferably at all processing devices or the control devices thereof. In this way, as mentioned above, a complete set of all requires parameters can be very quickly achieved or made available.

In a further preferred method, the predetermination parameters for carrying out a change of processing and in particular a change of type are output. A change of type is in particular a changeover to other containers, other beverages or also other fittings, for example labels or closures. A change of processing may be for example a changeover in which possibly individual processing assemblies are operated in another working mode or are replaced by other processing assemblies. Thus it is possible for example to change from a production of containers which require sterilisation to a production of containers which do not require this sterilisation. Such a change of processing can also take place by replacement of a specific assembly by another assembly.

On the other hand, a change of processing or of type is not understood below to include replacement of a merely defective component by another (intact) component. A change of processing or of type is generally understood in particular as a change which necessarily requires the changing of at least one parameter.

In a further preferred method an indication is output which shows that a change of type is imminent or generally an indication which is characteristic for a change of type. Thus for example an indication can be output to the machine that within a specific time period, for example in 20 minutes, a change of type is to be carried out or is carried out.

In a further preferred method at least one parameter is a parameter which is characteristic for the container to be processed and preferably this parameter is selected from a group of parameters which includes a container size (or container height), a container diameter, a container volume, a container material, a wall thickness of the container and the like. Thus these are parameters which are characteristic for the container to be produced, but potentially are also parameters which are characteristic for the plastics material parisons from which the containers are formed.

In a further preferred method at least one parameter is a parameter which is characteristic for the processing of the container, and preferably this parameter is selected from a group of parameters which includes a working speed of the machine, a heating temperature of plastics material parisons, a temperature for a label glue, an expansion pressure for plastics material parisons and the like. Thus these parameters not parameters which are specific for the container, but are parameters which are characteristic for the processing operation, for instance a stretch blow molding process of the plastics material parisons. Advantageously the predetermination parameters include not only parameters which are characteristic for the container or the containers but also parameters which are characteristic for the processing of the containers.

In a further preferred method at least one sequence control device requests the required parameters from the main control device.

However, it would also be conceivable for the sequence control device to request the required parameters directly from the user, who then possibly inputs these parameters on the sequence control device or directly on the relevant processing device.

In a further preferred method at least one processing device is selected from a group of processing devices which includes heating devices for heating plastics material parisons, sterilising devices for sterilising plastics material parisons and/or plastics material containers (in particular plastics material bottles), transforming devices for transforming plastics material parisons into plastics material containers, filling devices for filling containers, closure devices for closing containers, labelling devices for labelling containers, printing devices for printing containers, container digital printing machines, machines for inspecting containers, packing machines, palletising machines, cleaning machines for cleaning containers and the like.

In a further preferred method at least two of the said processing devices are blocked with one another, i.e. substantially permanently synchronised with one another with regard to their working and/or processing speed. In particular the method described here is suitable for such blocked installations, since in the case of blocked systems or machines in any case a very detailed communication must take place between the individual control devices of the processing devices. Several machines or processing devices of the system are preferably blocked with one another.

Furthermore, embodiments of the present invention are directed to an apparatus for processing containers. This apparatus has a first processing device, which processes the containers in a first predetermined manner. Furthermore, this apparatus has a second processing device, which processes the containers in a second predetermined manner. Furthermore a transport device is also provided, which transports the containers from the first processing device to the second processing device. In this case the two processing devices are each controlled by control devices, and the control devices control the respective processing devices using parameters which are characteristic for the containers and/or the processing of the containers.

Preferably the apparatus has a main control device, which outputs predetermination parameters to at least one sequence control device which serves for controlling at least one processing device, and furthermore the apparatus has at least one checking device, which is suitable and intended for checking whether all parameters required by the processing devices controlled by this sequence control device can at least be derived from the predetermination parameters and/or have been directly predetermined thereby.

Thus in terms of the apparatus it is also proposed that the respective sequence control devices in each case check whether all of the parameters required for the machine parts controlled by these sequence control devices have been transmitted.

Preferably the checking device has a storage device in which it is recorded which parameters are required for the operation of the respective processing device. Furthermore, the checking device preferably has a comparison device which compares the predetermination parameters with the required parameters. Preferably at least one sequence control device has a storage device, in which parameters of earlier processing operations on the containers are stored.

The sequence control devices preferably have an enquiring device, which can make enquiries to the main control device, in particular enquiries from which it is apparent which parameters still have to be input.

In a further preferred embodiment the apparatus has a display device, which is suitable and intended for output of data which are characteristic for such enquiries of the sequence control devices.

In a further preferred embodiment the main control device controls at least one processing device. Thus the main control device is preferably intended for controlling a processing device, such as for instance a filling device or a blow mould device. However, it would also be possible for the main control device to be a higher-level machine control device.

BRIEF DESCRIPTION

Some of the embodiments will be described in detail, with reference to the following figures, wherein like designations denote like members, wherein.

DETAILED DESCRIPTION

Figure 1:
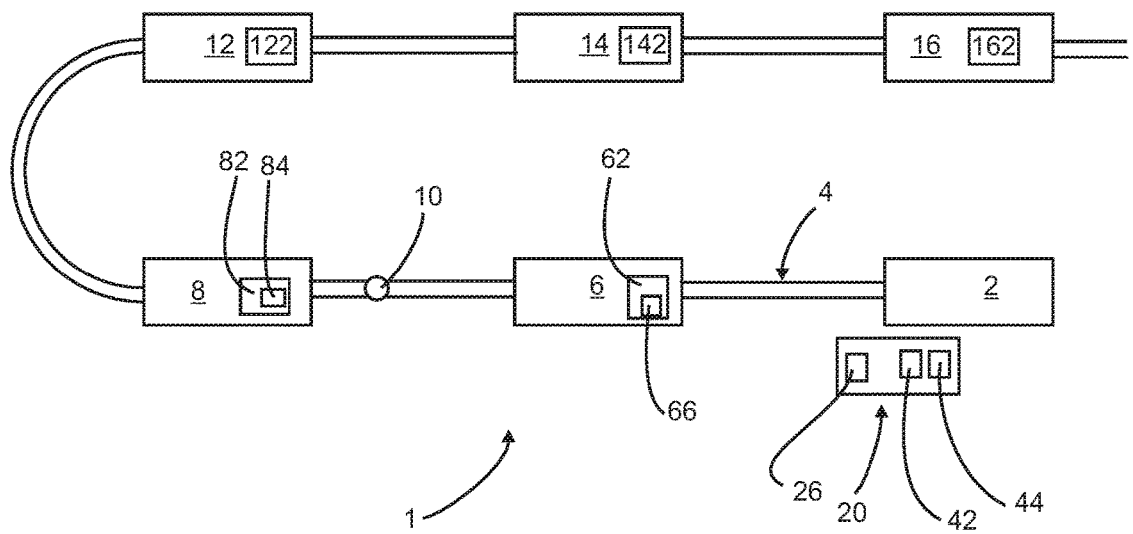
FIG. 1 shows a schematic representation of an apparatus according to embodiments of the invention for processing containers.

FIG. 1 shows a schematic representation of an apparatus 1 according to embodiments of the invention for processing containers. This apparatus 1 has a plurality of the processing devices 2, 6, 8, 12, 14, 16. The containers 10 are successively conveyed through these processing devices and are processed there in different ways. Thus for example the processing device 2 may be a heating device or an oven which heats plastics material parisons. Subsequently the plastics material parisons thus heated can be for example sterilised in a further processing device 6. In this case it is possible for this sterilising device 6 to sterilise an inner wall of the plastics material parisons for instance by electromagnetic radiation or electrons.

Downstream of this second processing device there is a further processing device 8, which may be for example a transforming device for transforming the plastics material parisons into plastics material containers. This transforming device 8 can be followed by a filling device 12, which fills the plastics material containers with a liquid and in particular a beverage. The reference numeral 14 here can represent a closure device which closes the plastics material parisons. Lastly, a plurality of plastics material containers can also be combined into packs by a processing device 16.

The reference numeral 4 designates a transport device, which serves for transporting the containers in particular from a processing device to a subsequent processing device. In this case these transport devices 4 can preferably be configured as transport starwheels which convey the plastics material parisons or containers 10. In this case these transport device(s) can also have individual control devices to which parameters are transmitted, for instance parameters for a bearer ring cross-section of the containers or for a height of the containers or also parameters for an operating speed of the apparatus 1.

For a change of type hitherto in the known art the user has input the relevant parameters to be changed into each individual one of the said processing devices. The following now proposes a simpler procedure. Thus the individual processing devices each have sequence control devices 62, 82, 122, 142, 162. These sequence control devices are connected in communication with a main control device 20 (which in the example illustrated here also serves for controlling the heating device). By an input device 42 the user can input changed data, i.e. parameters, required for instance for a change of type, into this main control device 20. These input data are also communicated to the further sequence control devices 62, 82 . . . . The reference numeral 44 relates to a display device, for example a display, by which information can be output to the user, for instance a request for more parameters to be input.

If the data input by the user are not sufficient, each of the sequence control devices 62, 82 . . . can request missing data from the main control device 20. Then the user can input the data which are still missing, and these can then be output to all sequence control devices 62, 82 . . . or all machines. For this purpose the individual sequence control devices 62, 82 . . . each have checking devices 84 (only one is shown), which check whether the predetermination parameters are complete. The reference numeral 66 designates a communication device, by which the sequence control device 6 can communicate with a communication device 26 of the main control device 20—in particular bidirectionally.

Figure 2:
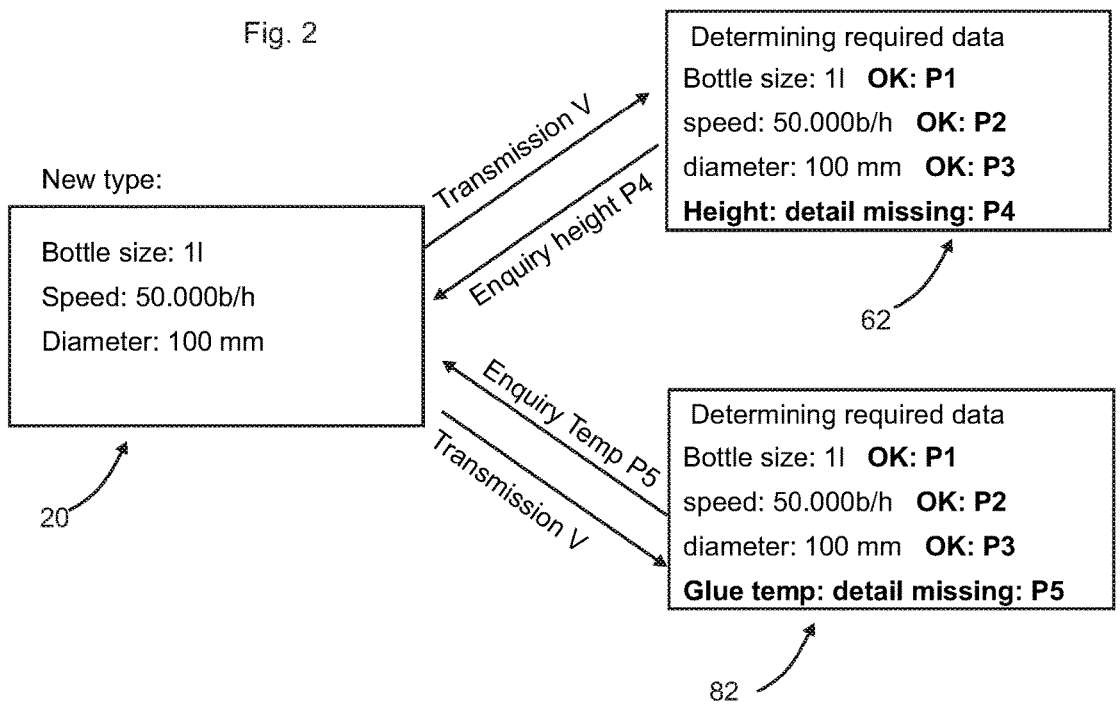
FIG. 2 shows a schematic representation for illustration of embodiments of the invention.

FIG. 2 shows a schematic representation for illustration of embodiments of the invention. In this case data, i.e. parameters, such as for instance a bottle size, an operating speed and a diameter of the container, are input by the main control device 20. These data are communicated as predetermination parameters V to two further sequence control devices 62 and 82. In this case this communication can take place wirelessly or also via a cable link. The respective sequence control devices 62 and 82 determine data or parameters P1, P2, . . . . Pn for operation thereof.

These are for example the bottle size (P1), which has already been communicated. The operating speed (P2) can also be required by the sequence control device 62 for the operation, and also the diameter (P3) of the container. However, the sequence control device 62 or the processing device 6 associated with this sequence control device 62 still requires information about the height of the container (P4). Consequently the sequence control device 62 requests the height from the main control device 20.

Accordingly, for example, the sequence control device 82 may still lack the information about a temperature of the label glue. This request can also be made to the main control device. In this case it is possible for the main control device 20 to collect all the missing data and to transmit to the user the instruction to supplement these data. When these data have been supplemented, all the sequence control devices can be supplied with these data.

Figure 3:
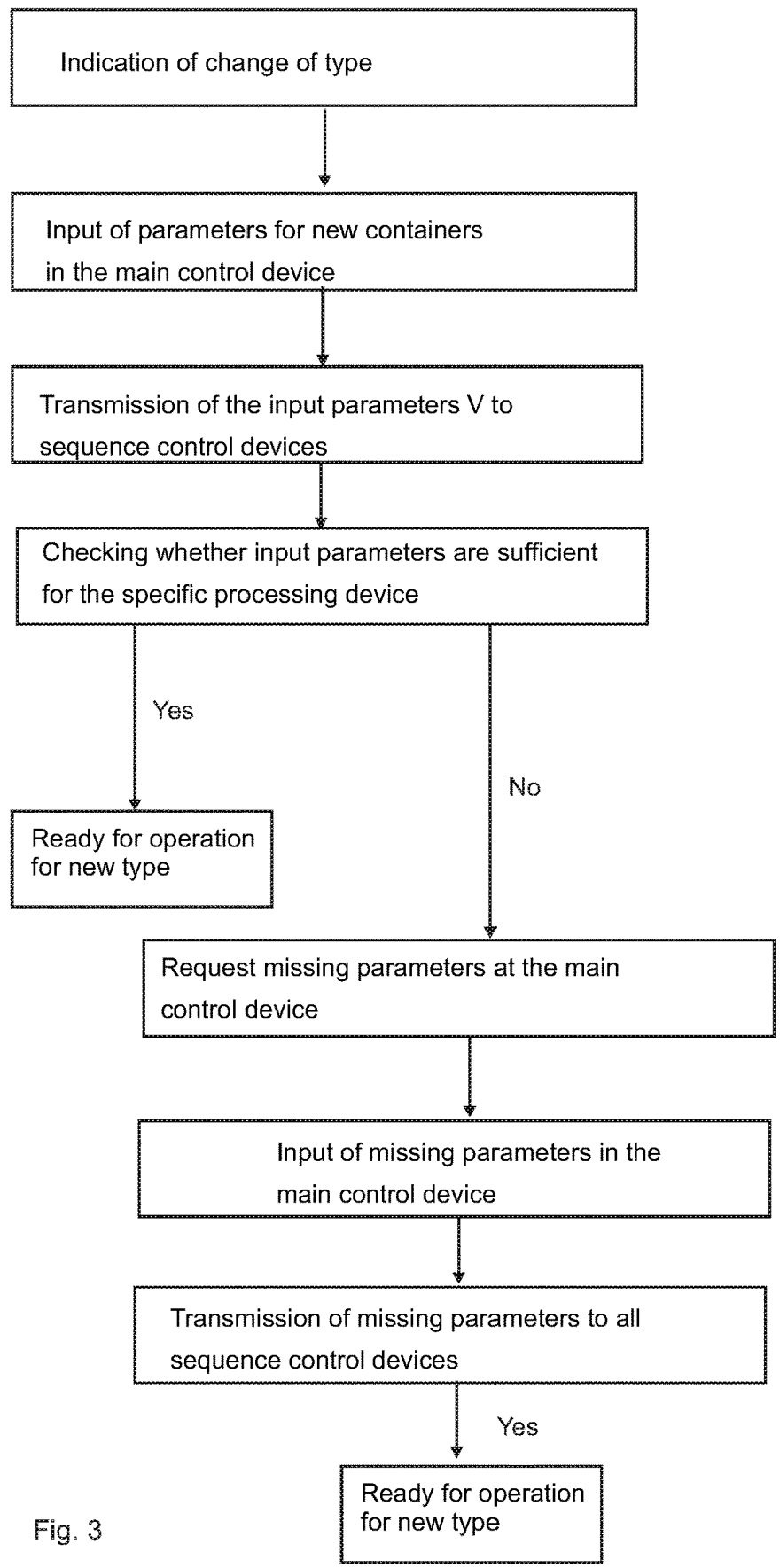
FIG. 3 shows a schematic flow diagram for a method according to embodiments of the invention.

FIG. 3 shows a flow diagram for a method according to embodiments of the invention. First of all, for example, a notification of a change of type is input by the user. Subsequently parameters for new containers are input in the main control device. These parameters are preferably communicated or transmitted as predetermination parameters V to all the sequence control devices of the further processing devices. The individual sequence control devices check whether the input parameters are sufficient for the specific processing device. If this is the case, the respective processing device is ready for operation for the new type.

If this is not the case, missing parameters are requested in particular at the main control device. In this case the input parameter sets are compared with the required parameter sets. Alternatively it would also be possible that the missing parameters are determined from the sequence control device itself, for instance on the basis of data sets used earlier.

In a further method step missing parameters are input into the main control device and in turn these missing parameters are transmitted to at least one and preferably all sequence control devices. Now all processing devices are ready for operation for the new type.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES

1 apparatus
2, 6, 8, 12, 14, 16 processing devices
4 transport device
10 containers
20 main control device
26 communication device
42 input device
44 display device
62, 82, 122, 142, 162 sequence control device
66 communication device
84 checking device
V predetermination parameter
P1-P5 required parameters

The invention claimed is:

1. A method for processing containers, wherein the containers are processed by a first processing device in a first predetermined manner and are transported by a transport device to a second processing device and are processed by this second processing device in a second predetermined manner, and wherein the processing devices are in each case controlled by control devices, wherein for control parameters are used which are characteristic of the containers and/or the processing of the containers, comprising: outputting predetermination parameters, on a plurality of the control devices, and comparing these output predetermination parameters with parameters required by at least one processing device, and checking whether the parameters required by the at least one processing device can be derived at least from the predetermination parameters, wherein required parameters which cannot be derived from the predetermination parameters are requested and outputting the requested parameters to all processing devices, wherein at least one sequence control device requests the required parameters from a main control device and the sequence control device and/or the main control device determines the required parameters which cannot be derived from the predetermination parameters, itself from the predetermination parameters, on the basis of data or parameters earlier used and/or already stored.

2. The method according to claim 1, wherein the predetermination parameters are output for carrying out a change of processing and in particular a change of type.

3. The method according to claim 1, wherein at least on parameter is a parameter which is characteristic for the container to be processed and this parameter is selected from a group of parameters which includes a container height, a container diameter, a container volume, a container material, and a wall thickness of the container.

4. The method according to claim 1, wherein at least one parameter is a parameter which is characteristic for the processing of the container, this parameter is selected from a group of parameters which includes a working speed of a machine, a heating temperature of plastics material parisons, a temperature for a label glue, a pressure, and a temperature.

5. The method according to claim 1, wherein at least one processing device is selected from a group of processing devices which includes heating devices for heating plastics material parisons, sterilizing devices for sterilizing plastics material parisons and/or plastics material containers, transforming devices for transforming plastics material parisons into plastics material containers, filling devices for filling containers, closure devices for closing containers, labelling devices for labelling containers, and printing devices for printing containers.

6. The method according to claim 1, wherein the sequence control device itself determines the required parameters which cannot be derived from the predetermination parameters.

7. The method according to claim 1, wherein at least two of the processing devices are blocked with one another.

8. An apparatus for processing containers, comprising a first processing device, which processes the containers in a first predetermined manner, a second processing device, which processes the containers in a second predetermined manner, and a transport device, which transports the containers from the first processing device to the second processing device, wherein the two processing devices are each controlled by control devices, and the control devices control the processing devices using parameters which are characteristic for the containers and/or the processing of the containers, wherein the apparatus has a main control device, which outputs predetermination parameters to at least one sequence control device which serves for controlling at least one processing device, and the apparatus is suitable and intended for checking whether all parameters required by the processing device controlled by this sequence control device can at least be derived from the predetermination parameters, wherein required parameters which cannot be derived from the predetermination parameters are requested and the requested parameters are output to all processing devices, wherein at least one sequence control device requests the required parameters from a main control device and the sequence control device and/or the main control device determines the required parameters which cannot be derived from the predetermination parameters, itself from the predetermination parameters, on the basis of data or parameters earlier used and/or already stored.

9. The apparatus according to claim 8, wherein the main control device controls at least one processing device.

* * * * *